United States Patent
Bose et al.

(10) Patent No.: US 7,421,601 B2
(45) Date of Patent: Sep. 2, 2008

(54) METHOD AND SYSTEM FOR CONTROLLING POWER IN A CHIP THROUGH A POWER-PERFORMANCE MONITOR AND CONTROL UNIT

(75) Inventors: Pradip Bose, Yorktown Heights, NY (US); Alper Buyuktosunoglu, White Plains, NY (US); Chen-Yong Cher, Port Chester, NY (US); Prabhakar N. Kudva, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 414 days.

(21) Appl. No.: 11/357,612

(22) Filed: Feb. 17, 2006

(65) Prior Publication Data

US 2007/0198863 A1    Aug. 23, 2007

(51) Int. Cl.
   *G06F 1/26* (2006.01)
   *G06F 1/32* (2006.01)
(52) U.S. Cl. .................... 713/320; 713/300
(58) Field of Classification Search .......... 713/320
   See application file for complete search history.

(56) References Cited

U.S. PATENT DOCUMENTS

| | | | |
|---|---|---|---|
| 5,903,717 A | 5/1999 | Wardrop | |
| 5,923,830 A | 7/1999 | Fuchs et al. | |
| 6,141,770 A | 10/2000 | Fuchs et al. | |
| 6,275,975 B1 | 8/2001 | Lambrecht et al. | |
| 6,834,353 B2* | 12/2004 | Smith et al. | 713/320 |
| 7,051,306 B2* | 5/2006 | Hoberman et al. | 716/6 |
| 7,278,034 B2* | 10/2007 | Shipton | 713/300 |
| 7,337,339 B1* | 2/2008 | Choquette et al. | 713/320 |
| 2005/0216222 A1 | 9/2005 | Inoue | |
| 2005/0216775 A1 | 9/2005 | Inoue | |

OTHER PUBLICATIONS

T. Simunic et al., "Managing Power Consumption in Networks on Chips", Proceedings of the 2002 Design Automation and Test in Europe Conf. and Exhibition; 2002; 7 pages.

J. Srinivasan et al., "Predictive Dynamic Thermal Management for Multimedia Applications", ICS '03, Jun. 23-26, 2003; San Francisco, CA; pp. 109-120.

(Continued)

*Primary Examiner*—Thuan N Du
(74) *Attorney, Agent, or Firm*—Keusey, Tutunjian & Bitetto, P.C.; Mark Wardas (57) ABSTRACT

A system and method for controlling power and performance in a microprocessor system includes a monitoring and control system integrated into a microprocessor system. The monitoring and control system includes a hierarchical architecture having a plurality of layers. Each layer in the hierarchical architecture is responsive to commands from a higher level, and the commands provide instructions on operations and power distribution, such that the higher levels provide modes of operation and budgets to lower levels and the lower levels provide feedback to the higher levels to control and manage power usage in the microprocessor system both globally and locally.

1 Claim, 7 Drawing Sheets

OTHER PUBLICATIONS

K. Sekar et al., "Dynamic Platform Management for Configurable Platform-Based System-on-Chips", Proceedings of the Int'l Conf. on Computer Aided Design (ICCAD '03); 2003; pp. 641-648.

K. Skadron et al., "Temperature-Aware Microarchitecture: Modeling and Implementation", ACM Transactions on Architecture and Code Optimization, vol. 1, No. 1, Mar. 2004, pp. 94-125.

K. Skadron, "Hybrid Architectural Dynamic Thermal Management", Proceedings of the Design, Automation and Test in Europe Conference and Exhibition (2004); 6 pages.

P. Juang, et al., "Coordinated, Distributed, Formal Energy Management of Chip Multiprocessors", ISLPED '05; Aug. 8-10, 2005; San Diego, CA; pp. 127-130.

* cited by examiner

METHOD AND SYSTEM FOR CONTROLLING POWER IN A CHIP THROUGH A POWER-PERFORMANCE MONITOR AND CONTROL UNIT

GOVERNMENT RIGHTS

This invention was made with Government support under Contract No.: NBCH30390004 awarded by the Defense Advanced Research Projects Agency (DARPA). The Government has certain rights in this invention.

BACKGROUND

1. Technical Field

The present invention relates generally to dynamic management and control of power and performance for an integrated circuit chip, and more specifically, to systems and methods for a power/performance monitoring and control unit that can improve instruction throughput and power management.

2. Description of the Related Art

Chip-level power dissipation limits constitute a fundamental design constraint in future high-performance microprocessors. In a multi-core processor, the chip-level performance targets are aggressive, and meeting the power budget at high performance levels presents a major design challenge. On-chip, dynamic power management is therefore a design feature that needs to be considered as an integral part of the overall architecture.

Several analysis have shown that clock-gating alone is not enough to meet the chip-level power budget for multi-core designs that could meet the chip-level performance requirements. Both average and maximum power need to be managed to remain within acceptable limits, dictated by power-related maintenance cost budgets and cooling/packaging solution cost limits.

Previous research has shown that individual techniques for dynamic management of power (be it of the active, passive or both), invariably have the following characteristics: (a) the average power savings is a strong function of the input workload; in fact in some cases, the net power savings may even be zero or negative; (b) depending on the technique, there is usually an associated performance penalty—either in terms of cycle time (frequency) or cycles per instruction (CPI); (c) there is an area overhead that is paid as a price for any expected power reduction; (d) there is no direct or easy way to bound the worst-case power that is consumed: usually, the only way is an empirical pre-silicon evaluation using an assumed worst-case workload.

As such, given conventional solutions to reduce power, it is clear that ideally, one would like to invoke a subset of these solutions, depending on the workload or the particular phase of the workload. This implies the need for some kind of a "monitor-and-control" facility that would sense the workload demand and microarchitectural activity and dynamically invoke particular mechanisms from within a full repertoire of architected techniques for power reduction and control.

SUMMARY

A power/performance monitor and control unit that can maximize instruction throughput for a processor chip for a given power envelope, based on power needs of a runtime application and identifying change of phase of the application runtime behavior is disclosed. Illustrative embodiments are described hereinafter and may include the following systems and methods.

A system and method for controlling power and performance in a microprocessor system includes a monitoring and control system integrated into a microprocessor system. The monitoring and control system includes a hierarchical architecture having a plurality of layers. Each layer in the hierarchal architecture is responsive to commands from a higher level, and the commands provide instructions on operations and power distribution, such that the higher levels provide modes of operation and budgets to lower levels and the lower levels provide feedback to the higher levels to control and manage power usage in the microprocessor system both globally and locally.

Systems and methods for controlling power consumption of a microprocessor chip or microprocessor-based system are disclosed where the maximum power of the chip (or system) is maintained within a (programmable) limit; the peak temperature across monitored regions of the chip (or system) is maintained to be below a specified limit; and the net throughput performance of the chip (or system) is targeted for maximization, within the specified constraints of power and temperature.

The control is preferably hierarchical with each element of control at each of n (e.g., 3) layers of the hierarchy having its own distinct domain of action and domain of authority. Each layer receives commands from control agents/elements in the hierarchy, and transmits commands to initiate specified actions to those reporting control agents. The control agents within a particular layer, other than the topmost layer (with the highest authority) is, in general, enabled to initiate a subset of its overall action set, autonomously, without waiting for a command from its higher authority in the control hierarchy.

The maximum power limit for the chip (or system) may be provided by the topmost layer of the control hierarchy (e.g. the one with the highest authority), and may be changed occasionally, in response to global conditions external to the domain of control of the full hierarchical control system stipulated. The peak temperature limit of the chip (or system) may be a preset design specification, determined by the package/cooling solution engineered for the chip (or system). The performance may be targeted for maximization by one or more of the following: (a) use and deployment of one or more additional cores (that would otherwise be powered off or excluded from the design in the absence of a dynamic power management method such as described herein); and (b) at a given response point, and given a choice of power mode allocations per core, make an allocation such as to maximize the chip (or system)—level throughput performance.

The assigned power/performance budget for the chip (or system), in association with monitored power and performance levels received from the lower-level resources may be translated by the intermediate layer(s) of the control hierarchy into a set of power modes that are transmitted downwards to effect the operation of each physically monitored resource in the chip (or system). Each power mode, transmitted to a physically monitored resource as a command, is acted upon to place the resource into a specified configuration, such that its power level is decreased or increased (with corresponding decrease or increase in net performance). The amount of such change in power or performance is available from, e.g., an (updatable) power-performance tradeoff table (PPTT) maintained at the appropriate level of the control hierarchy.

The intermediate level control algorithm may be further guided in its decision by inputs derived from a Phase History Table (PHT), a Phase Prediction Table (PPT) and a Decision History Table (DHT). The PHT may include a structure (with update semantics and control) maintained to record the history of information (related to power, temperature, voltage and performance metrics) periodically supplied by the physically monitored resources at the lowest level of the hierarchy.

The PPT may include a structure (with update semantics and control) maintained to record the information needed to perform accurate prediction of the changes and duration of distinct workload phases, characterized by power and performance data as recorded within the PHT. The DHT may include a structure (with update semantics and control) maintained to record the history of previous decisions (and effects thereof) of the intermediate control layer(s).

A system (referred to herein as the power-performance control unit or PMCU) of implementing a multiple layer hierarchical control mechanism may include a consolidated software layer (possibly including a more generalized combination of firmware, operating system (OS) and hypervisor layers), referred to herein generically and without loss of generality as OS, that serves as the topmost control layer with the highest authority. An on-chip (or on-system) global PMCU hardware controller may be provided that serves as the intermediate control layer. A set of local PMCU monitor-and-control units are preferably associated with each physically monitored core, storage and interconnect resource on the chip (or system), that serve collectively as the lowermost control layer.

The system implements control function methods at each level of the hierarchy through, e.g., finite state machine feedback control mechanisms, guided by inputs derived from tabular storage structures, PHT, PPT, DHT and PPTT (in addition to interface data and control registers maintained for communication between OS and hardware) implemented as part of the global PMCU hardware. A global PMCU control loop may be employed in one of hardware-only mechanism or a hardware-software mechanism, with the overall outcome of setting power mode commands, that are transmitted to the local PMCU's.

A local PMCU control loop may be implemented in hardware as a closed loop finite state controller, wherein the target power budget for each physically monitored resource is achieved through application of the suggested power mode (received from the global PMCU). Any available power slack is capitalized upon by increasing performance, using the command set available for autonomous control at the local PMCU level.

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of a power-performance monitor and control unit (PMCU) preferably form an integral part of a microprocessor design. Systems and methods are described for controlling power consumption of a microprocessor chip or microprocessor-based system where the power of the chip (or system) is maintained within a programmable limit; the peak temperature across monitored regions of the chip (or system) is maintained to be below a specified limit; and the net throughput performance of the chip (or system) is targeted for maximization, within the specified constraints of power and temperature.

One objective of PMCU is to address the challenge of reducing power by exploiting the variability within a workload and between different workloads. Several different objectives can be pursued.

For example, given a chip which has X watts power limit due to packaging/cooling constraints, the chip can only fit Y amount of cores and Z amount of level 2 memory (e.g., L2 cache) without any dynamic management of power. On the other hand, a chip which has dynamic management of power that exploits workload phase behavior and can increase Y and Z components within the X watts limit at an early design stage. The PMCU can meet the X watts limit with the increased number of Y and Z. Also, the PMCU can dynamically manage chip power between the components (cores and L2) to meet the power limit with the expectation of increased system performance.

In another example, a chip has a packaging/cooling solution for an X watts power limit may cost C dollars without any dynamic management of power. On the other hand, a chip which has dynamic management of power can reduce the X watts power limit by exploiting the slack in the workloads and thus has a much cheaper packaging/cooling solution. The PMCU would reduce the X watts limit and associated packaging/cooling cost without loss in performance.

Furthermore, in one aspect, a user can choose to reduce average power, once the maximum power limit constraint is met. This may come at the expense of increased performance degradation.

Embodiments of the present invention can take the form of an entirely hardware embodiment, an entirely software embodiment or an embodiment including both hardware and software elements. In a preferred embodiment, the present invention is implemented in hardware, but may include software elements, which may further include but are not limited to firmware, resident software, microcode, etc.

Furthermore, the present invention can take the form of an integrated circuit chip, which may be accessible to a computer-usable or computer-readable medium providing program code for use by or in connection with a computer or any instruction execution system.

For the purposes of this description, the system may include a computer readable medium. The medium can be any apparatus that may include, store, communicate, propagate, or transport a program or data for use by or in connection with an instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk.

Embodiments of the present invention may be included in a data processing system suitable for storing and/or executing program code and may include at least one processor coupled directly or indirectly to memory elements. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

The chip or chip set as described herein is preferably an integrated circuit chip. The chip design may be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Figure 1:
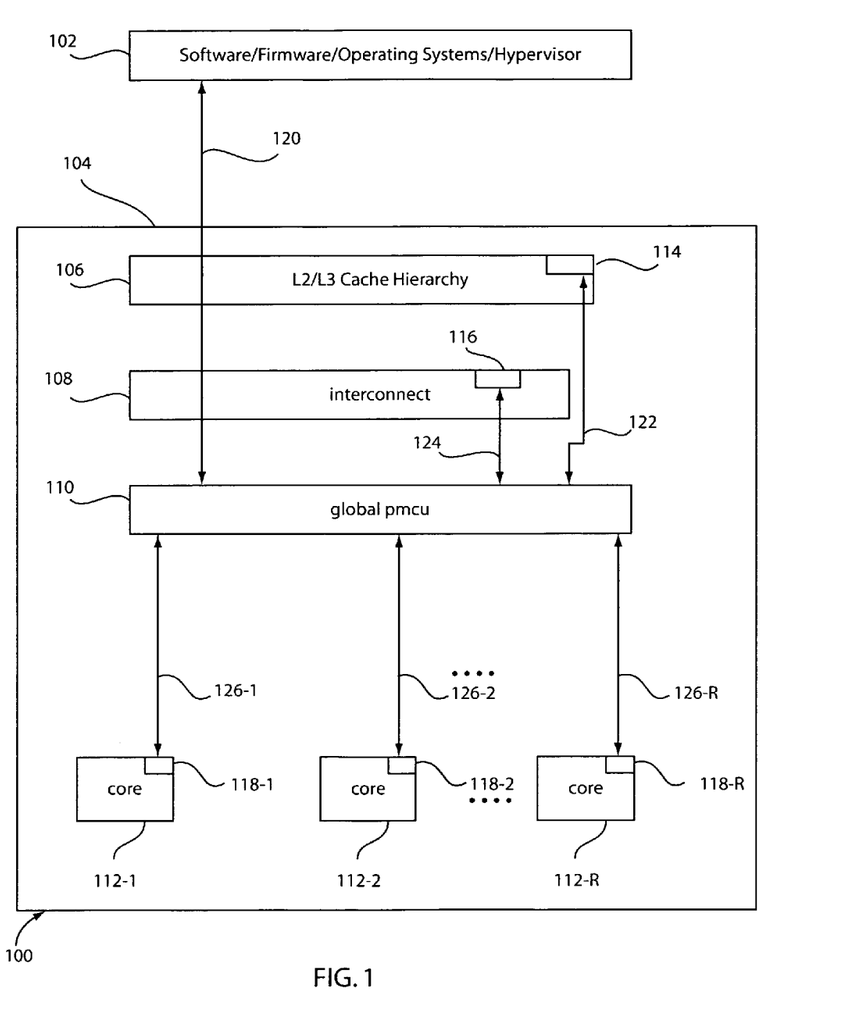
FIG. 1 is a block diagram showing a hierarchical power-performance monitor and control unit (PMCU) integrated into a chip/system.

Referring now to the drawings in which like numerals represent the same or similar elements and initially to FIG. 1, a high level overview of PMCU organization is shown in a system 100. In general terms, the PMCU organization includes distributed or local components 114, 116, 118-1, 118-2 . . . 118-R and global components 110 engaged in the tasks of monitoring and controlling in a multi-core chip 104.

Localized self-monitoring of activity and performance can enable a given functional unit or sub-unit to take a local response action that would reduce power or increase performance to meet a local budget or target respectively. Whereas, global monitoring of events and activities at the chip-level may be used to decide upon issues related to things like, e.g., overall task management, thread prioritization, load balancing, etc.

The local components 114, 116, 118-1, 118-2, 118-R and global component 110 of the PMCU are preferably hierarchical and function as a cooperative management system. To minimize area, power and verification overhead of the PMCU, the PMCU preferably includes a hardware-software co-designed engine, where software (e.g., compiler and operating system) 102 works in cooperation with hardware instrumentation and control primitives in ensuring a low-cost, robust solution.

Each element or entity in this management hierarchy, e.g., cores 112-1, 112-2, 112-R or L2/L3 cache hierarchy 106, interconnect 108, local PMCU facility 118-1, 118-2, 118-R, 114, 116, the chip-level global PMCU facility 110, or even the Operating System (OS) 102 itself, which has the highest authority in the hierarchy, is architected to provide the following general functions. The general functions may include: (a) monitor events, activity levels and direct power and/or temperature levels or suitable proxies thereof, within its domain of authority; (b) provide direct response mechanisms to manage power within its domain of action, using a set of predefined commands native to this domain; (c) report on a summary of monitored results and actions taken, to the next higher authority in the power management hierarchy: e.g., each local PMCU 118-1, 118-2, 118-R, 114, 116 reports upwards to the on-chip global PMCU 110 through links or connections 126-1, 126-2, 126-R, 122, 124, and the global PMCU 110 reports to the authority empowered with the highest priority PMCU function, e.g., the software/firmware/OS/hypervisor 102 through connection 120.

Note that the action set of block 102 does not include the "report upward" task, since it is at the highest level of the management hierarchy. In addition, each component in the PMCU hierarchy also stores a history of actions taken at its level. Such history may be used by itself or a higher-level PMCU component to make better decisions over time.

The relationships among block 102, global PMCU 110 and local PMCUs 114, 116, 118-1, 118-2, 118-R are a hierarchy of reports and commands, with block 102 on top of the hierarchy, followed by the global PMCU 110 and the local PMCUs 114, 116, 118-1, 118-2, 118-R. To clearly define the responsibility of each layer of the hierarchy, the layers are designed and configured such that the layers report upward and command downward in the hierarchy. In a few cases such as, e.g., in a temperature emergency, the lower layer may be forced to take immediate action and afterward report to the upper layer.

The local PMCUs 114, 116, 118-1, 118-2, 118-R monitor activities in each core 112-1, 112-2, 112-R, L2/L3 cache hierarchy 106 and interconnect 108 and carry out power-reducing optimizations as commanded by the global PMCU 110. The local PMCUs 114, 116, 118-1, 118-2, 118-R monitor performance statistics such as cache miss rates, branch misprediction rates, instructions per cycle (IPCs), etc. It can be assumed that each core 112-1, 112-2, 112-R, L2/L3 cache hierarchy 106 and interconnect 108 is capable of simultaneous multithreading (SMT). As such, the local PMCUs 114, 116, 118-1, 118-2, 118-R monitor this information on a per-thread basis. The local PMCUs 114, 116, 118-1, 118-2, 118-R also monitor information such as power usage and temperature usage and report the information to the global PMCU 110 periodically.

To better assign power to each core element 112-1, 112-2, 112-R, 106, and 108, the global PMCU 110 may employ a phase prediction technique based on the information provided by the local PMCUs 114, 116, 118-1, 118-2, 118-R.

Based on the information and the objective of the system 100, the global PMCU 110 chooses appropriate power optimizations for each core element 112-1, 112-2, 112-R, 106, and 108. For design simplicity, these optimizations can be packaged into different power modes based on their power-performance trade-off characteristics. A power mode may be defined to be higher if it is expected to consume more power and to achieve higher performance, and to be lower if it is expected to consume less power and to achieve lower performance, relative to other power modes.

Based on the thermal packaging, power supply and other considerations, the global PMCU 110 is given an overall chip 104 power budget, and is responsible for assigning the budget to each core element 112-1, 112-2, 112-R, 106, and 108. The PMCU system/network may also be budgeted power and performance, depending on the application.

When the main objective of the system is performance, the global PMCU 110 will choose the power modes and assign power for each core element 112-1, 112-2, 112-R, 106, and 108 such that all elements can run at the highest possible performance within the budget. Power modes may include variations in voltage, current or any other electrical property. Examples of power modes may include standby or active modes.

The global PMCU 110 also presents an interface 120 to the software layer 102. Software 102 can poll the global PMCU 110 for information that can be used for thread scheduling, profiling and recompilation. In emergency cases, the global PMCU 110 can push information to the OS 102 by raising an exception. Because the OS and the software 102 have more knowledge about the application than the PMCU hardware (e.g., 118-1, etc.), they can better prioritize and schedule threads.

Figure 2:
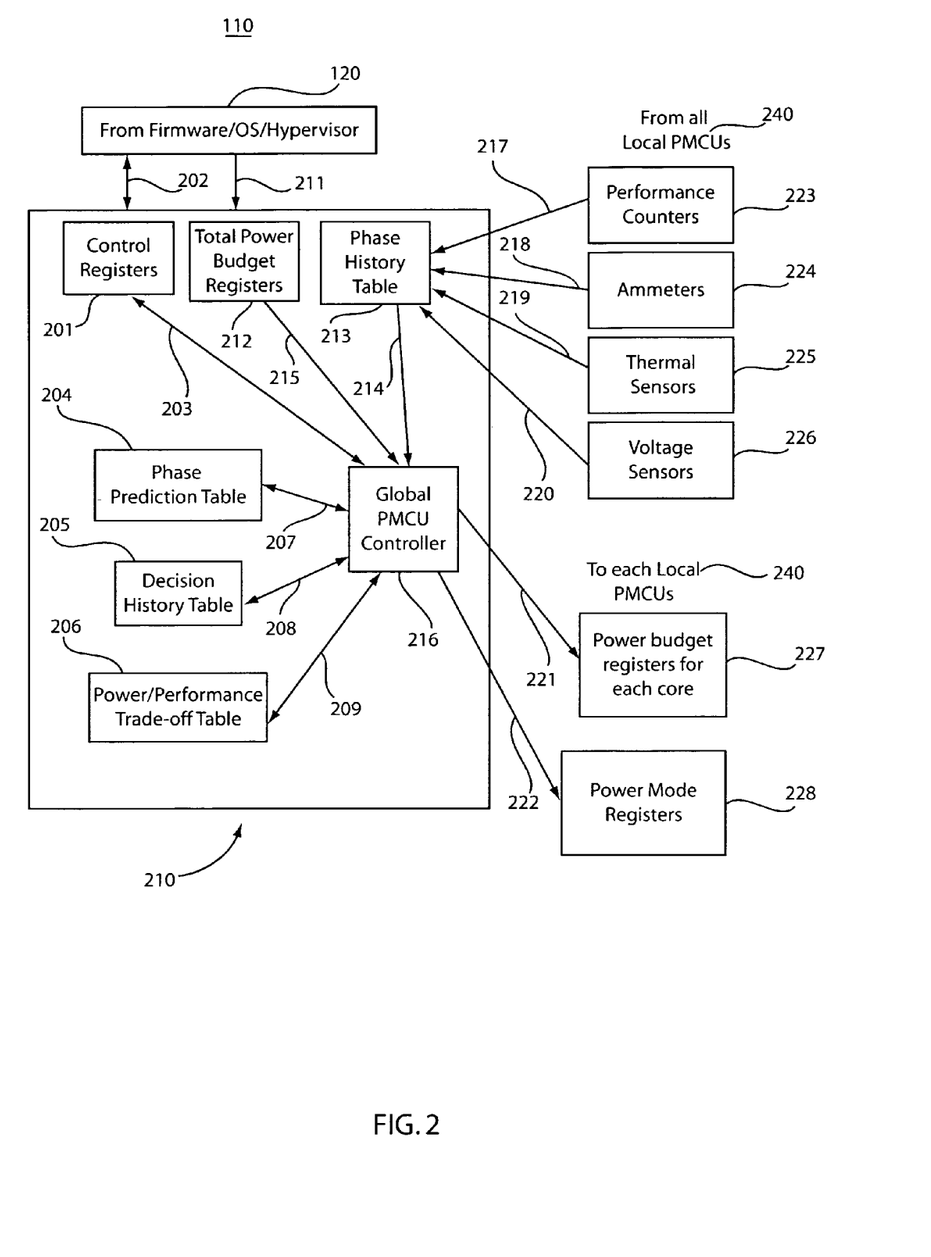
FIG. 2 is a block diagram showing a global power-performance monitor and control unit (PMCU) in an intermediate level of the hierarchy.

Referring to FIG. 2, a hardware structure for the global PMCU 210 is illustratively depicted. The global PMCU 210 includes a Global PMCU Controller 216, a Phase Prediction Table 204, a Decision History Table 205, a Power/Performance Trade-off Table 206, a Phase History Table 213, Control Registers 201 and Total Power Budget Registers 212. Although not depicted, local PMCUs and to/form connections will be referred to generally with the find numeral 240. The global PMCU 210 is one communication point among the local PMCUs 240 and the OS 120. The global PMCU 210 stores history information periodically supplied from units of all the local PMCUs 240 in real time in the Phase History Tables 213. These local PMCU units 240 supply performance statistics such as performance events of each thread from Performance Counters 223 through connection 217, power usage from Ammeters 224 through connection 218, temperature of various units on the core by the Thermal Sensors 225 through connection 219 and voltage statistics from Voltage Sensors 226 through connection 220. Other monitoring devices may be employed to measure these and other characteristics.

In addition, connections 217, 218, 219 and 220 or other connections described herein may include wired or wireless links or may be included in a bus or the like.

The global PMCU 210 also stores commands specified by the OS 120 in the Control Registers 201 through connection 202 and stores power budgets specified by the OS 120 in the Total Power Budget Registers 212 through connection 211. The global PMCU 210 adjusts its algorithm according to these registers (201, 212). The OS 120 stores control primitives in Control Registers 201, where the primitives can be specifications related to, e.g., overall task management, thread prioritization, load balancing, etc. The OS 120 also specifies the power budget permitted by the whole system and possibly also the power budgets for each of the cores. Budgets could be specified as a set of numbers, e.g., one for each of minimum, average and maximum power, etc.

By reading real time environmental statistics from the Phase History Table 213 through connection 214, the power budgets from Total Power Budget Registers 212 through connection 215 and the OS commands from Control Registers 201 through connection 203, the Global PMCU controller 216 can dynamically perform optimizations for performance and power from a globally optimal standpoint which the local PMCUs 240 would not be able to achieve individually.

To perform effective optimizations, the global PMCU 210 relies on a few tables within itself. The Phase Prediction Table 204 includes information needed to perform accurate phase prediction, in which the word phase represents the durations and values of the power and performance related statistics such as those provided by the Phase History Table 213. The global PMCU 210 reads and updates the Phase Prediction Table through connection 207.

The Decision History Table 205 includes previous decisions made by the Global PMCU controller 216 and the consequences of these decisions. Such information is needed to avoid the system from falling into an oscillating destructive behavior as well as assigning power budgets more intelligently by learning about consequences of past decisions. The global PMCU controller 216 reads and updates the Decision History Table through connection 208.

The Power/Performance Trade-off Table 206 includes the predicted power and performance for each power mode, where the global PMCU controller 216 reads through connection 209 to assist in calculating the power modes and power budgets for each core. The global PMCU controller 216 updates the Power/Performance Trade-off Table 206 through connection 209, after considering information from the Phase Prediction Table 204 and the Decision History Table 205.

After the global PMCU controller 216 calculates the power budget and power mode for each core, the Global PMCU controller 216 sends the associated power budget for each core to the power budget registers 227 in the associated local PMCU 240 through connection 221. The associated power modes for each core are sent to power mode registers 228 in associated local PMCUs through connection 222.

The global PMCU 210 also presents an interface 202 to software 120 to perform thread scheduling, hardware reconfiguration, online/offline profiling and recompilation. The OS 120 (and thus other user-level software through system calls to OS) can obtain all the information in the global PMCU tables 213, 204, 205 and 206 by reading special registers in Control Registers 201, which the global PMCU controller 216 updates through connection 203. To minimize wire delay, the physical design of the global PMCU 210 may be a distributed structure.

Figure 3:
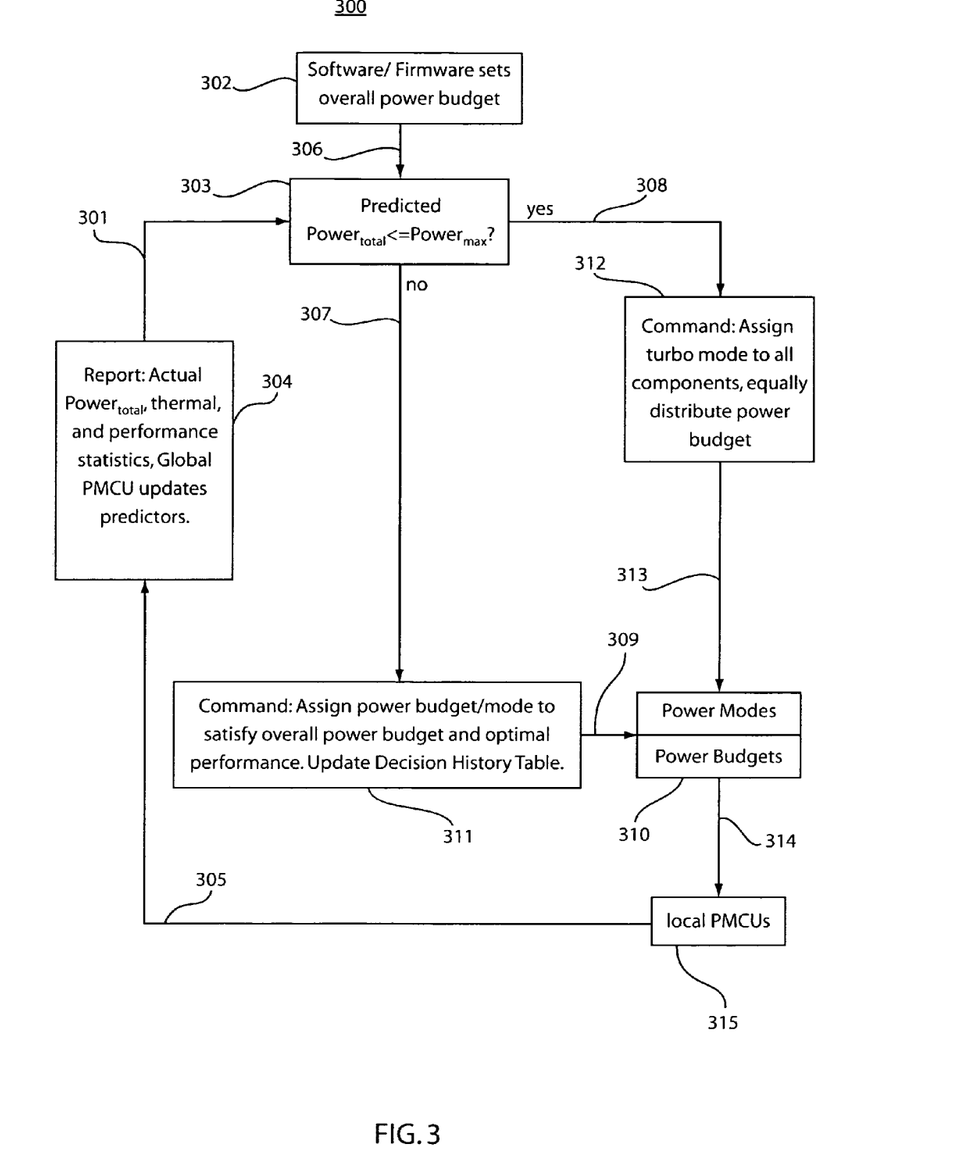
FIG. 3 is a block/flow diagram showing a global power-performance monitor and control unit (PMCU) loop for monitoring and controlling system power and performance.

Referring to FIG. 3, a Global PMCU Control Loop 300 is shown when software 302 (OS/Hypervisor/Firmware) commands the global PMCU at initialization only. Loop 300 uses the physical hardware structure as shown in FIG. 2. Each block in FIG. 3 represents a state/module and the text within the block includes actions associated with the state. At initialization, the software 302 sets the overall power budget register control registers to default values.

After the initialization, the Global PMCU (210) operates in a looping manner, first by transitioning through edge 306 into state 303, which checks if the actual total power is below the power budget. If the actual total power is below or equal to the total power budget, the loop transitions through edge 308 to state 312, which commands all the cores to run in the highest power mode and divide the power budget equally among all the cores. The state 312 translates these commands through edge 313 in the form of Power Modes and Power Budgets 310 and sends the commands to local PMCUs 315 through edge 314.

From state 303, if the actual total power is not below or equal to the total power budget, the loop transitions through edge 307 into state 311, and the state 311 assigns power budget and power mode with consideration of: the commands from OS 120 (stored, e.g., in Control Registers 201 and total power budget from the Total Power Budget Registers 212, both depicted in FIG. 2), the real time statistics (stored e.g., in the Phase History Table 213 depicted in FIG. 2) and the power/performance trade-off of each mode for each thread in each core (stored, e.g., in the Power/Performance Trade-off Table 206, depicted in FIG. 2).

With these considerations, the state 311 assigns a lower power mode for a core if the power budget assigned to the core is insufficient and increases to higher power modes if the cores are exceeding the power budget, such that the sum of power usage for all components fits into the overall power budget. Considerations for assigning power modes include avoiding high temperature of a local component on each core or reducing average and maximum power of each core. The state 311 translates these commands through edge 309 in the form of Power Modes and Power Budgets 310 and sends them to the local PMCUs 315 through edge 314.

The local PMCUs 315 operate with the newly assigned power budget and power modes 310, and report the new real time information to the Global PMCU Control Loop 300 through edge 305. If the information includes events such as over the budget of power, over voltage or overheating emergencies that need immediate attention from the OS 302, the global PMCU loop 300 notifies the OS 302 by raising an interrupt or exception.

The loop transitions into state 304 through edge 305. State 304 updates the Phase History Table 213, Phase Prediction Table 204, Decision History Table 205 and Power/Performance Trade-off Table 206 (these components 213, 204, 205 and 206 are depicted in FIG. 2) with the new information. The loop then transitions back to state 303 through edge 301.

Figure 4:
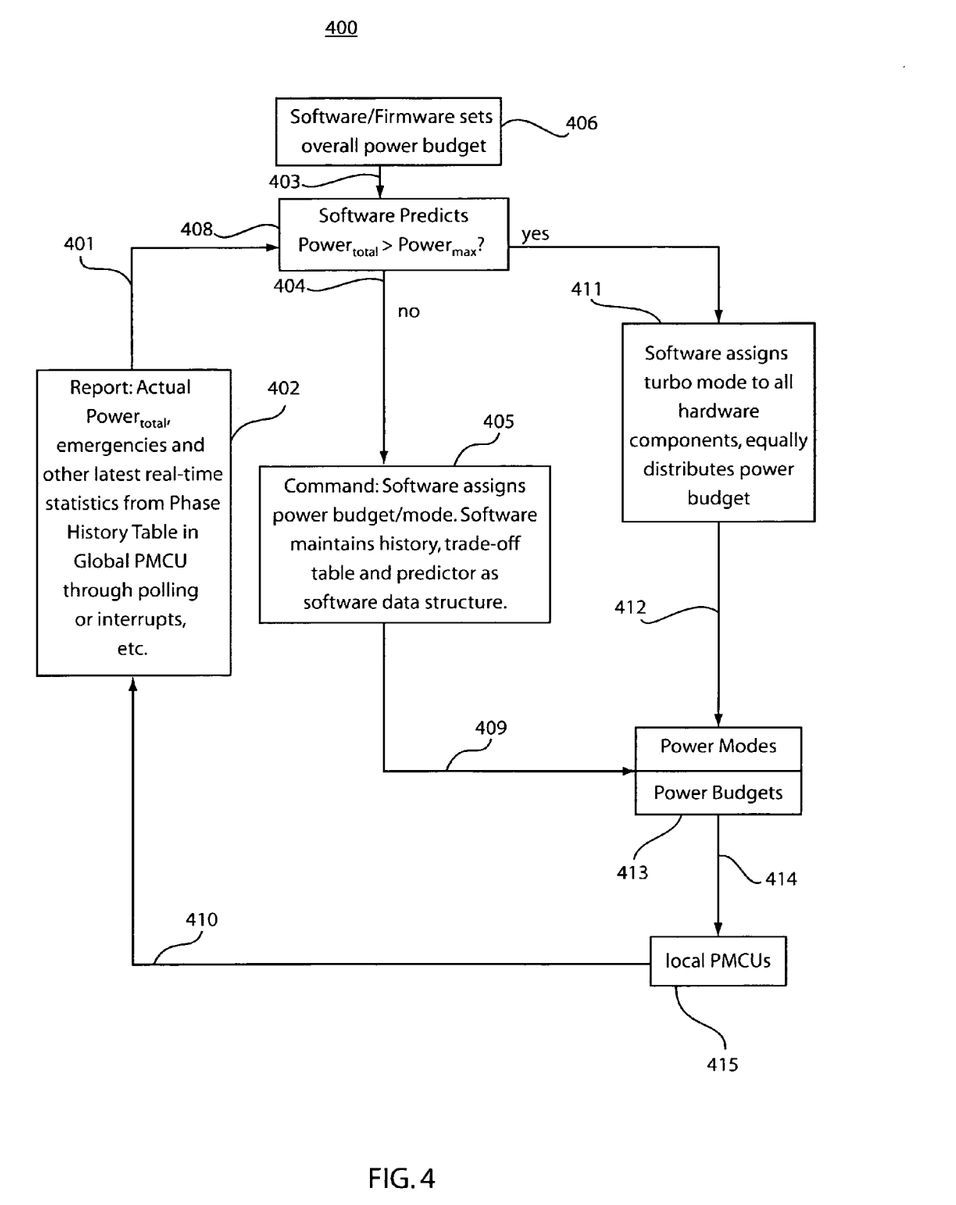
FIG. 4 is a block/flow diagram showing a global power-performance monitor and control unit (PMCU) loop having software implemented elements for monitoring and controlling system power and performance.

Referring to FIG. 4, a Global PMCU Control Loop 400 is illustratively shown for the case where the software 406 (OS/Hypervisor/Firmware) continuously interacts with and commands the global PMCU (210) and the local PMCUs 415, assuming the physical hardware structure of FIG. 2. Each block in FIG. 4 is a state and the text within it includes actions associated with the state. At the initialization, the software 406 sets the overall power budget register control registers to default values.

After initialization, the software 406 operates in a looping manner, first by transitioning through edge 403 into state 408, which checks if the actual total power is below the power budget. Software 406 obtains the actual total power by reading from Control Registers 201 depicted in FIG. 2. If the actual total power is below or equal to the total power budget, the loop 400 transitions through edge 407 to state 411, which commands (again through Control Registers 201) all the cores to run in the highest power mode and divide the power budget equally among all the cores. The state 411 translates these commands through edge 412 in the form of Power Modes and Power Budgets 413 and sends them to the local PMCUs 415 through edge 414.

From state 408, if the actual total power is not below or equal to the total power budget, the loop transitions through edge 404 into state 405, where the state assigns the power budget and power mode 413. The state assigns the power budget and power mode 413 taking into consideration information from OS scheduling, real-time statistics (software read from Phase History Table (e.g., 213 of FIG. 2), and stored in memory) and power/performance trade-off information from each mode for each thread in each core (software maintains history and Trade-off Table 206 in memory based on the real-time statistics).

With these considerations, the state 405 assigns a lower power mode for a core if the power budget assigned to the core is insufficient. State 405 assigns a higher power mode if there is excess power as compared to the power budget, such that the sum of power usage for all components fits into the overall power budget. Other possible considerations for assigning power modes include avoiding high temperature of a local component on each core or reducing average and maximum power of each core.

The state 405 translates these commands through edge 409 in the form of Power Modes and Power Budgets 413 and sends them to the local PMCUs 415 through edge 414. The local PMCUs 415 operate with the newly assigned power budget and power modes 413, and report information back to the global PMCU and occasionally also OS 403. The information includes the new real-time information which is also sent back to the Phase History Table (213 of FIG. 2) or may include emergency event information such as over-budget of power, a voltage emergency and/or overheating, which may need immediate attention from the OS 406.

The loop 400 transitions into state 402 through edge 410, in which edge 410 could be a predetermined delay or an interrupt. In state 402, the software 406 reads the Phase History Table (213 of FIG. 2) and updates its Phase Prediction Table (204 of FIG. 2), Decision History Table (205 of FIG. 2) and Power/Performance Trade-off Table (206 of FIG. 2) (in memory) with the new information. The loop 400 then transitions back to state 408 through edge 401.

Figure 5:
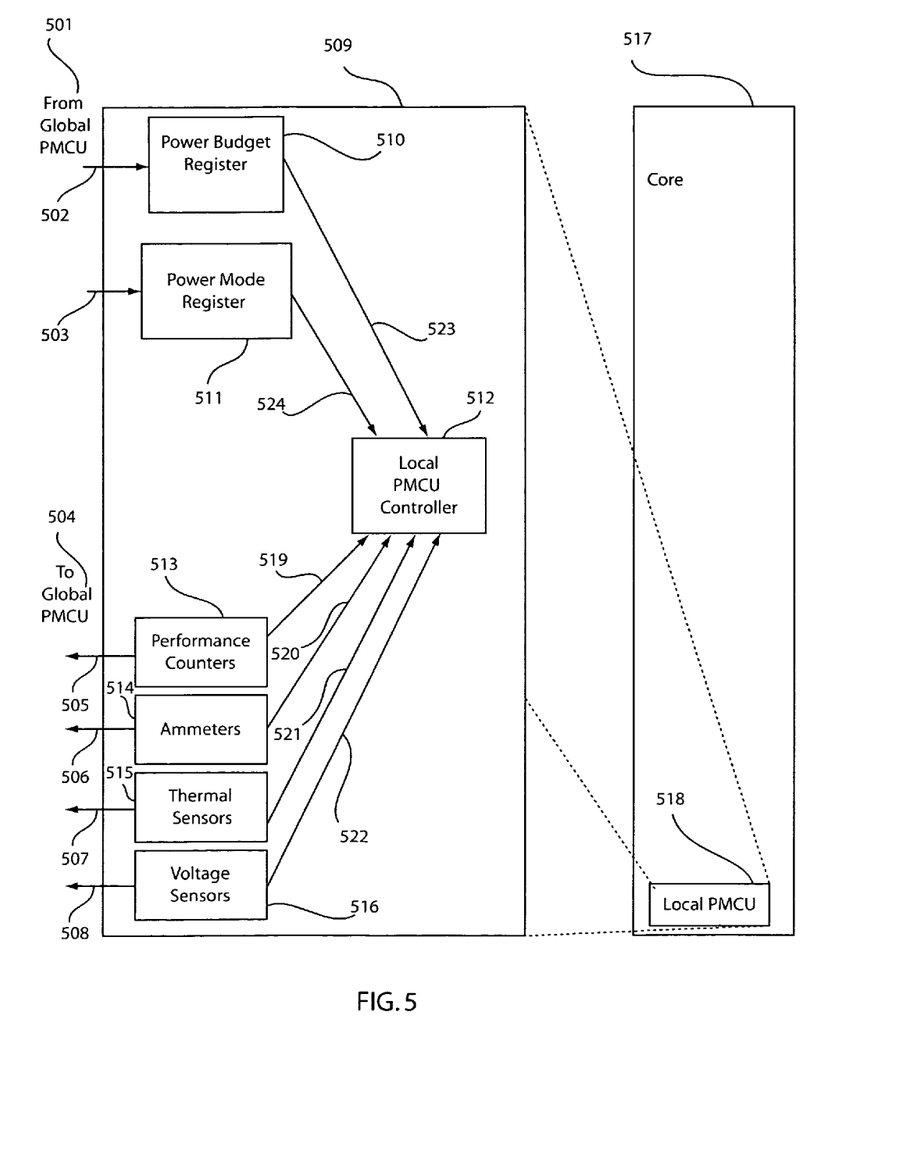
FIG. 5 is a block/flow diagram showing a magnified local power-performance monitor and control unit (PMCU) and a core which the local PCMU controls.

Referring to FIG. 5, a hardware structure 509 for a local PMCU 518 on each core 517 is illustratively shown in accordance with one embodiment. Structure 509 is a zoomed-in view of the local PMCU 518. The local PMCU 518 includes a local PMCU Controller 512, a Power Budget Register 510, a Power Mode Register 511, Performance counters 513, Ammeters 514, Thermal sensors 515 and Voltage Sensors 516. Other sensors may also be included instead of or in addition to those depicted. Fewer sensors may also be employed.

The local PMCU 509 communicates with the global PMCU (to the global PMCU (504) using connections 505, 506, 507 and 508 and from the global PMCU (501) using connections 502 and 503). The local PMCU 509 periodically supplies information to the global PMCUs in real time. The local PMCU 509 supplies performance statistics of each thread from Performance Counters 513 through connection 505, power usage of the core from Ammeters 514 through connection 506, temperature of various units on the core by the Thermal Sensors 515 through connection 507 and voltage statistics from Voltage Sensors 516 through connection 508.

The local PMCU 509 also includes a power budget for its core which is set in the Power Budget Register 510 by the global PMCU through connection 502. The power mode for its core is set in the Power Mode Register 511 by the global PMCU through connection 503.

Based on the power budget and power mode received through connections 523 and 524, the Local PMCU Controller 512 performs local optimizations to fit actual core power usage to that specified by the power budget, and operate in the voltage and frequency specified by the power mode. The local PMCU 509 acts as a central unit for coordination of information for the entire core 517. The local PMCU 518 assumes that the core is already optimized for power with ideal clock gating techniques. Therefore, the local PCMU 518 focuses primarily on microarchitectural techniques for power reduction through improved power/performance tradeoffs, Dynamic Voltage Frequency Scaling (DVFS) and power gating techniques.

To obtain the best performance out of a given power budget and power mode, the local PMCU controller 512 uses self-monitoring of power and performance, with statistics from the Performance Counters 513 through connection 519, with power usage of the core from Ammeters 514 through connection 520, with temperature of various units on the core by the Thermal Sensors 515 through connection 521 and with voltage statistics from Voltage Sensors 516 through connection 522.

The local PMCU controller 512 uses these statistics to decide which microarchitectural techniques to be employed and also their corresponding parameters to achieve the desired power/performance trade-offs.

Figure 6:
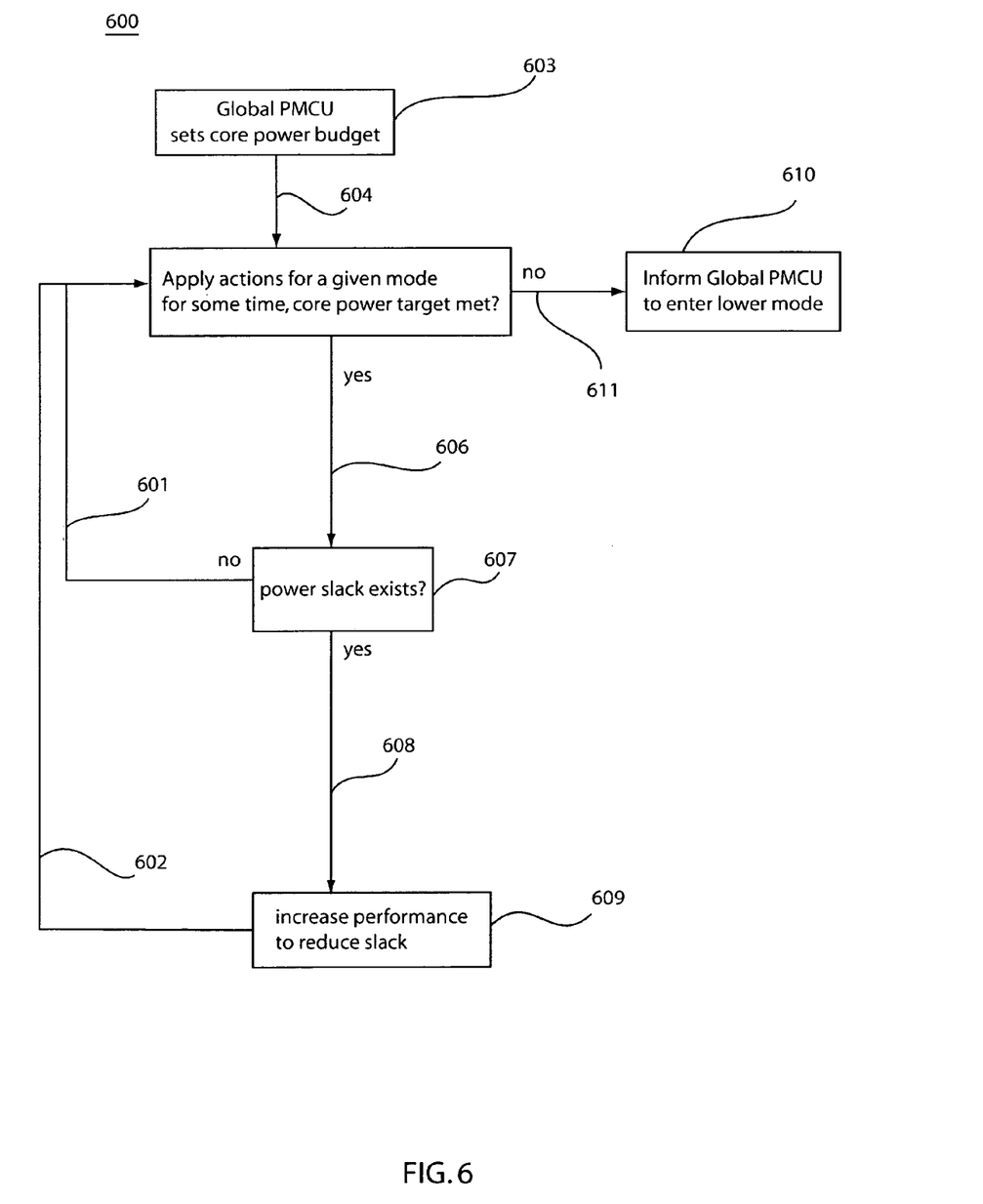
FIG. 6 is a block/flow diagram showing a local power-performance monitor and control unit (PMCU) loop for taking action in accordance with commands from a global PMCU.

Referring to FIG. 6, a control loop 600 is illustratively shown for a local PMCU, using the physical hardware structure of FIG. 5. Each block in FIG. 6 represents a state and the text within the block includes actions associated with the state. In state 603, the global PMCU sets a core power budget. The control loop 600 transitions to state 605 through edge 604. State 605 applies all possible actions within the specified mode. The actions within a mode are predefined at chip design time for a given mode. The actions are applied using a sequence of output signals to the local units.

If the core power target for that mode is met, the control loop 600 transitions to state 607 through edge 606. State 607 checks if power slack exists. If power slack exists, the control loop 600 transitions to state 609 through edge 608 to increase performance by using more power, then transitions back to state 605 through edge 602. If power slack does not exist, the control loop 600 transitions back to state 605 through edge 601.

From state 605, if the core power target is not met, the control loop 600 transitions to state 610 through edge 611, where state 610 will inform the global PMCU to assign a lower power mode to this core. The local PMCU may decide to dramatically reduce activities on the core if the power budget is severely insufficient.

Figure 7:
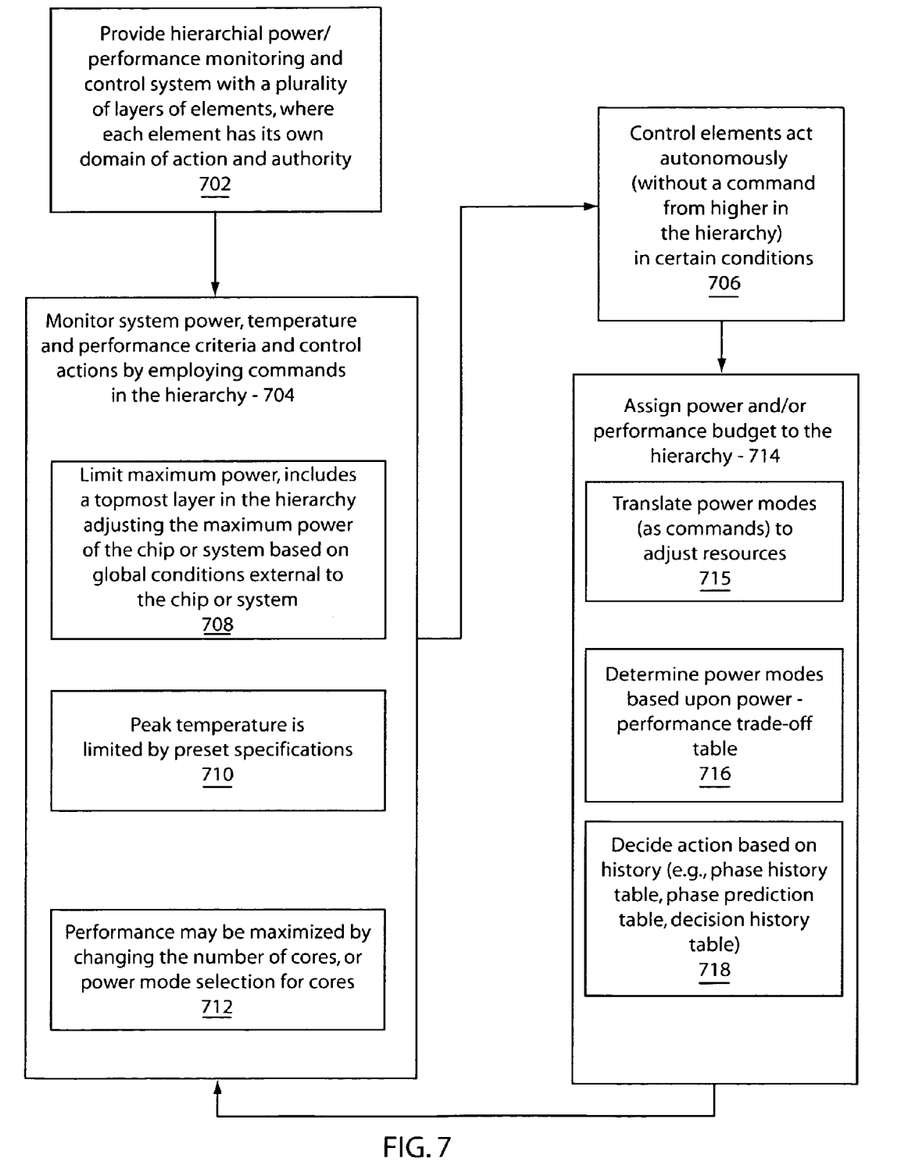
FIG. 7 is a block/flow diagram showing a system/method for hierarchical power-performance monitoring and control in accordance with an illustrative embodiment.

Referring to FIG. 7, a system/method for controlling power and performance on a chip or system includes the following steps/modules. In block 702, a hierarchical power and monitoring system is provided having a plurality of layers with elements of control at each layer of the hierarchy. Each element of control has a distinct domain of action and domain of authority. In block 704, monitoring of one or more of a maximum power of a chip (or system) within a programmable limit, a peak temperature across monitored regions of the chip (or system) below a specified limit, and/or a net throughput performance of the chip (or system) within the specified constraints of power and temperature is performed and maintained. This is achieved by receiving commands from control elements above in the hierarchy to control elements lower in the hierarchy to initiate specified actions in accordance with reports sent from control elements lower in the hierarchy.

In block 706, a control element lower in the hierarchy may react to a condition or conditions to autonomously initiate an action without waiting for a command from a higher layer in the hierarchy. This includes an emergency situation or situation where reaction time is important. The action can be reported to higher elements at a later time.

The maximum power is monitored and controlled. When the maximum power limit for the chip or system is provided by a topmost layer of the hierarchy, the maximum power limit may be changed in block 708, in response to global conditions external to a domain of control of the chip or system. This includes receiving information from a source external to the chip or system in response to an event that has occurred in an external environment. Other local and global limits may also be imposed.

In block 710, the peak temperature limit of the chip (or system) may be a preset design specification, determined by the package/cooling solution engineered for the chip (or system). In block 712, the performance of the chip or system may be targeted for maximization by one or more of the following: (a) use and deployment of one or more additional cores (that would otherwise be powered off or excluded from the design in the absence of a dynamic power management method such as described in this invention); and (b) at a given response point and given a choice of power mode allocations per core, an allocation is made such as to maximize the chip (or system)—level throughput performance.

In block 714, an assigned power/performance budget for the chip (or system), in association with monitored power and performance levels received from the lower-level resources may be assigned or translated by the intermediate layer(s) of the control hierarchy into a set of power modes that are transmitted downwards in block 715 to effect the operation of each physically monitored resource in the chip (or system). Each power mode, transmitted to a physically monitored resource as a command, is acted upon to place the resource into a specified configuration, such that its power level is decreased or increased (with corresponding decrease or increase in net performance).

In block 716, the amount of such change in power or performance is available from an (updatable) power-performance tradeoff table (PPTT) maintained at the appropriate level of the control hierarchy.

The intermediate level control algorithm may be further guided in its decision, in block 718, by inputs derived from a Phase History Table (PHT), a Phase Prediction Table (PPT) and a Decision History Table (DHT). The PHT includes a structure (with update semantics and control) maintained to record the history of information (related to power, temperature, voltage and performance metrics) periodically supplied by the physically monitored resources at the lowest level of the hierarchy. The PPT includes a structure (with update semantics and control) maintained to record the information needed to perform accurate prediction of the changes and duration of distinct workload phases, characterized by power and performance data as recorded within the PHT. The DHT includes a structure (with update semantics and control) maintained to record the history of previous decisions (and effects thereof) of the intermediate control layer(s).

Having described preferred embodiments of a system and method for controlling power in a chip through a power-performance monitor and control unit (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims.

Having thus described aspects of the invention, with the details and particularity required by the patent laws, what is claimed and desired protected by Letters Patent is set forth in the appended claims.

What is claimed is:

1. A system for controlling power and performance in a microprocessor system, comprising:
   a monitoring and control system integrated into a microprocessor system on an integrated circuit chip, the monitoring and control system including:
   a hierarchical architecture, which includes a plurality of layers, each layer in the hierarchal architecture being responsive to commands from a higher level, the commands providing instructions on operations and power distribution, each level in the hierarchical architecture, wherein the integrated circuit chip includes cores where power is distributed as a local layer in the hierarchy, and a local power management and control unit (PMCU) is integrated at each core, and wherein the integrated circuit chip includes a global power management and control unit (PMCU) configured to interface between local PMCUs and a higher level in the hierarchy, the architecture including:
   a monitor device to monitor one or more of events, activity levels, direct power and temperature levels, within a domain of authority of the monitor device;
   a direct response mechanism configured to manage at least one of power and performance within a domain of action of the direct response mechanism, using a set of commands native to this domain of action; and
   a reporting device configured to report on monitored results and actions taken, to a next higher level in the hierarchy, if a next higher level exists.

* * * * *